United States Patent [19]
Jones

[11] Patent Number: 5,280,556
[45] Date of Patent: Jan. 18, 1994

[54] CABLE CLOSURE WHICH INCLUDES A CABLE SHEATH GRIPPING ASSEMBLY

[75] Inventor: Wesley W. Jones, Lawrenceville, Ga.

[73] Assignee: AT&T Bell Laboratories, Murray Hill, N.J.

[21] Appl. No.: 951,066

[22] Filed: Sep. 25, 1992

[51] Int. Cl.$^5$ .............................................. G02B 6/36
[52] U.S. Cl. ..................................... 385/139; 385/135; 385/136
[58] Field of Search ............... 385/134, 135, 136, 137, 385/138, 139

[56] References Cited

U.S. PATENT DOCUMENTS

| | | | |
|---|---|---|---|
| 4,178,068 | 12/1979 | Hoover | 385/138 X |
| 4,296,996 | 10/1981 | Niiro et al. | 385/138 |
| 4,927,227 | 5/1990 | Bensel et al. | 385/135 |
| 5,113,475 | 5/1992 | Baker | 385/138 |
| 5,155,795 | 10/1992 | Wasserman et al. | 385/138 |

*Primary Examiner*—Rodney B. Bovernick
*Assistant Examiner*—Phan Heartney
*Attorney, Agent, or Firm*—Edward W. Somers; Donald E. Hayes, Jr.

[57] ABSTRACT

A closure includes an end plate assembly (20) which includes an inner and an outer endplate and between which is disposed a cable sheath gripping assembly (60). The cable sheath gripping assembly includes a housing (62) and a clamping portion (100) which cooperate to form two cable-receiving passageways. Each passageway is formed between two channels, one being formed in the base and one being formed in the clamping portion. Each channel is provided with a plurality of inwardly extending circumferential and axial ribs with the ribs cooperating to clamp a cable end portion extending therewith. The engagement of the ribs with the cable end portion under compressive engagement caused by the turning of a bolt 106 into threaded insert of the housing provides enhanced resistance to pullout and rotation of the cable end portion.

13 Claims, 3 Drawing Sheets

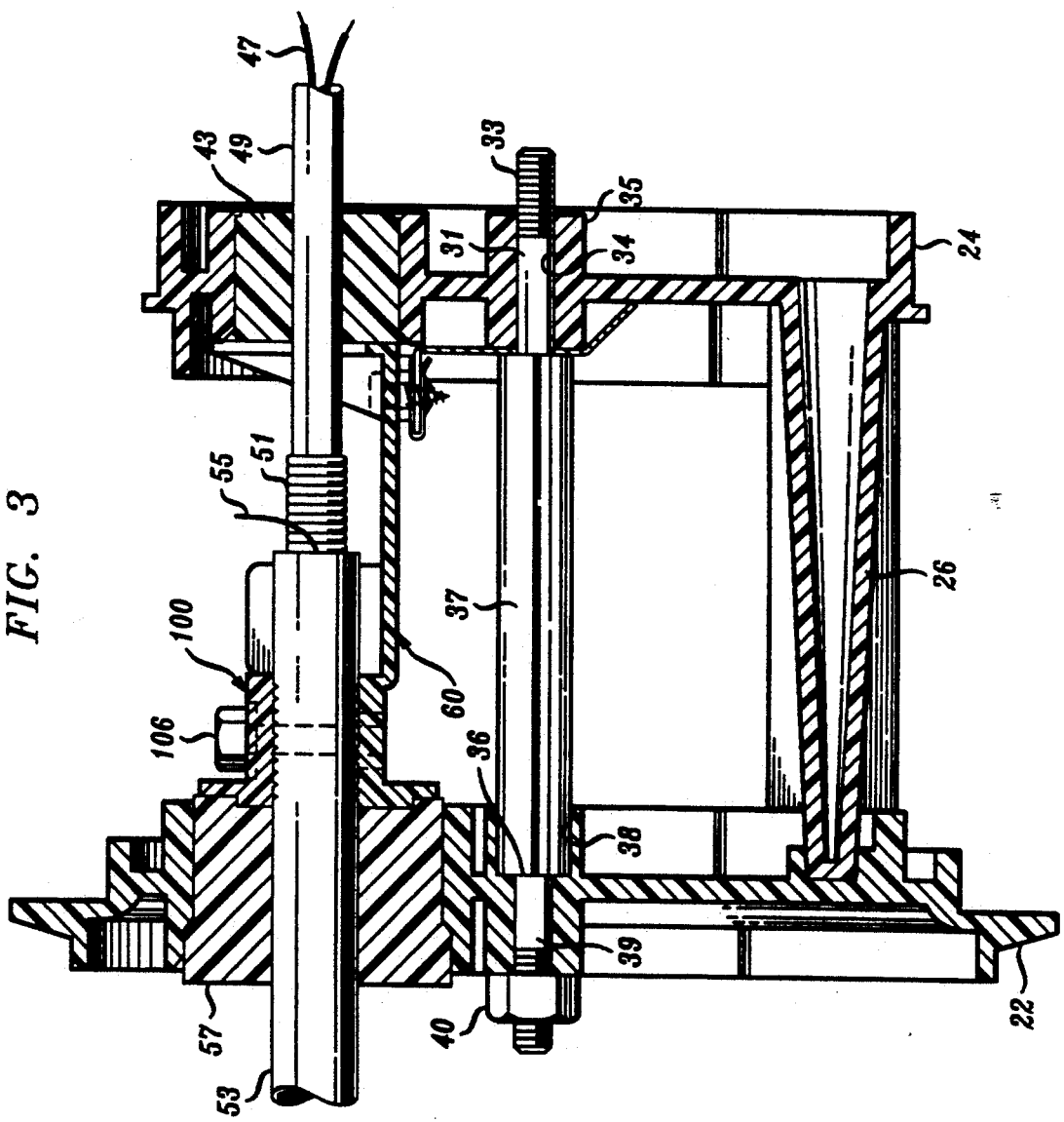

1

CABLE CLOSURE WHICH INCLUDES A CABLE SHEATH GRIPPING ASSEMBLY

TECHNICAL FIELD

This invention relates to a cable closure which includes a cable sheath gripping assembly. More particularly, the invention relates to a cable closure which includes a cable sheath gripping assembly which is effective over a range of sizes.

BACKGROUND OF THE INVENTION

Whatever the structure of a cable, there must be provisions for splicing transmission media at an end of a given length of cable to corresponding transmission media at an adjacent end of another length of cable. Closures are used in the splicing of metallic conductor and of optical fiber cables.

For example, an optical fiber splice closure with a central transverse bulkhead has been used. Individual optical fibers are spliced and are attached to the bulkhead for support. A disadvantage of this approach is the lack of facilities for the storage of slack in the fibers. In other splicing arrangements, all the optical fibers in a cable are looped within the same retainer or fiber slack is stored on spools. In either case, identification, repair or splice work of individual fibers is extremely difficult without a major rearrangement within the splice closure. This is undesirable because the transmission capability in active fibers can be affected as they are moved.

In another closure of the prior art, there is provided a device for organizing a plurality of individual optical fibers or other similar type conductors or fibers at a slack or splice point. A device having modular construction is provided which is suitable for installation in standard splice closures. The device comprises a plurality of tray-like members each adapted to retain and store at least one fiber. The device provides access to the individual fibers contained in the trays.

It is important that the cables extending into or out of the closure be held tightly to prevent undesired movement of portions of the cable inside the closure. Should the cable move, movement of conductors will be experienced. Such movement of conductors may have an adverse effect on communications signals passing through the conductors within the closure and break the seal between the grommet and the cable passing therethrough.

In the past, a metal member extended from an inner end plate toward an outer end plate. Annular wormgear clamps were disposed about each cable to hold the cable to the metal member in a secured position. This arrangement prevents each cable from being pulled out, but it does not prevent cable sealing members which are referred to herein as grommets from being displaced. The inner cable grommet may be displaced because of air pressure within the closure which is used to check the integrity of the seals.

Also needed is support for the outer cable grommets located in the outer end plate. External forces such as water pressure or ice formation may cause the outer grommets to be pushed inwardly.

Further, each closure should be capable of being used with a range of cable sizes. In the past, metal hardware had to be bent by a user to conform to different size cables. What is sought after is a sheath gripping device which can accommodate a range of cable sizes.

Another disadvantage of prior art sheath grips resides in electrical shorting. A metal bracket is commonly attached to cables entering the closure through the outside end plate. In the past, the metal sheath grip bracket sometimes contacted bonding and grounding devices attached to the metallic elements of the cable thereby causing a short out. It is desired to overcome this failing of prior art sheath grips because it sometimes is desirable to isolate electrically one cable from another.

What is needed and what is not provided in the prior art is a cable closure which includes a cable sheath grip which avoids short outs with neighboring metallic elements and which can accommodate a range of cable sizes. The sought after cable sheath grip also should provide support for grommets in end plates of a cable closure and should be easy and quick to install.

SUMMARY OF THE INVENTION

The foregoing problems of the prior art have been overcome by a cable closure of this invention. The cable closure includes a housing into which end portions of cables extend, the closure comprising an end plate assembly which includes at least one opening therethrough, a sealing device, called a grommet, which is disposed in said opening and which includes a passageway for having an end portion of a cable extend therethrough, and a cable sheath gripping assembly which is disposed within said end plate assembly and which includes a housing and a clamping portion which are adapted to be assembled together. The housing and the clamping portion each include channels and troughs, respectively, which cooperate to provide cable-receiving passageways with each channel and trough including a plurality of inwardly directed circumferential and axial ribs that cooperate to clamp a cable end portion therebetween and prevent relative movement between the cable end portion and the end plate assembly.

BRIEF DESCRIPTION OF THE DRAWING

Other features of the present invention will be more readily understood from the following detailed description of specific embodiments thereof when read in conjunction with the accompanying drawings, in which:

FIG. 3 is a front elevational view of the portion of the closure shown in FIG. 1.

DETAILED DESCRIPTION

Figure 1:
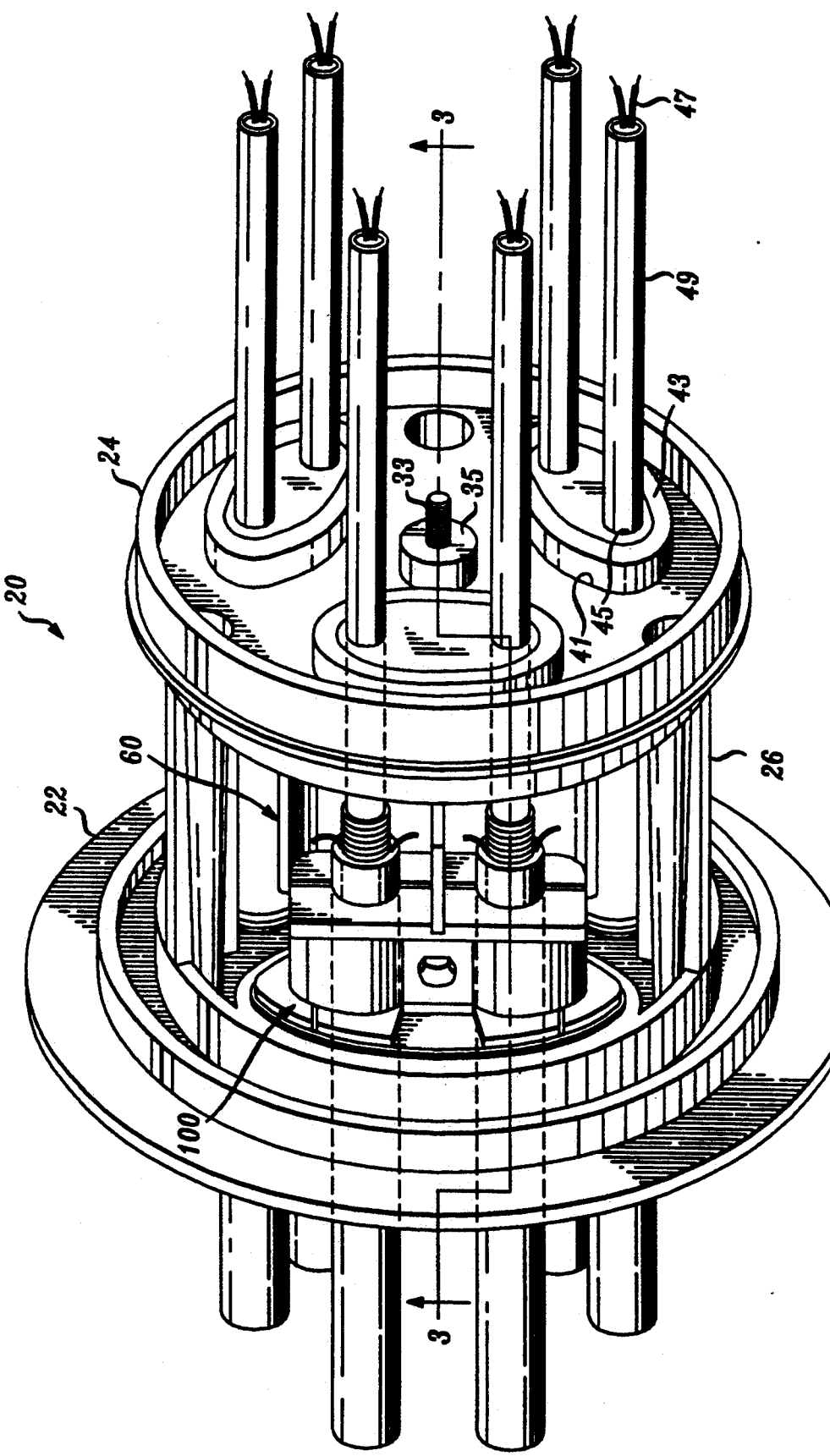
FIG. 1 is a perspective view of a portion of a closure which includes a sheath grip assembly.

Referring now to FIG. 1, there is shown an end plate assembly of a cable closure, end plate assembly being an end portion and being designated generally by the numeral 20. The portion 20 includes an outer end plate 22 and an inner end plate 24. The inner end plate 24 includes laterally extending portions 26—26 (see FIGS. 1 and 3) which are integral with the inner end plate.

The two end plates 22 and 24 are held spaced apart by the portions 26—26 which engage inwardly facing surfaces of the outer end plates. An assembly stud 31 having threaded end portions is used to hold together the end plates 22 and 24. One end portion 33 of the assembly stud is disposed in an opening 34 in a boss 35 of the inner plate 24 with a threaded portion extending beyond the inner end plate 24 and adapted to have a nut (not shown) turned thereover. An opposite end 36 of an enlarged portion 37 of the assembly stud is disposed in a cavity 38 of the outer end plate 22. An external assembly stud 39 having each end threaded has one end turned into an internally threaded end of the enlarged portion 37 until it is drawn up tightly by turning an integral nut 40 against the outer end plate to thereby hold together the inner and outer end plates.

The laterally extending portions 26—26 space apart the two end plates and the assembly stud causes compressive engagement between the enlarged portion 37 and the two end plates and between free ends of the laterally extending portions and the outer end plate.

The end plate assembly may be disposed at one end of a closure. This arrangement is referred to as a butt splice closure. In such a closure, cables enter and leave the closure from one end through the end plate assembly 20. Another common arrangement includes an end plate assembly at each end of a closure. In order to provide access for cables, each of the end plates is provided with a plurality of openings. As is seen in FIG. 1, the inner end plate 24 is provided with a plurality of openings 41—41. In each opening is disposed a grommet 43 or other sealing device. Each grommet 43 generally is formed of a resilient, conformable material and has one or more openings 45 formed therethrough. Through each opening extends a cable such as cable 47. Conductors of the cables may be spaced within the closure generally on facilities which are supported from the inner end plate 24 or from the closure housing.

Each of the cables generally includes a core comprising a plurality of conductors 47—47 (see FIGS. 1 and 3) which are disposed within at least one tubular member 49. The tubular member 49 in the cable shown in FIG. 3 may be disposed within a metallic shield 51 and an outer plastic jacket 53. A rip cord 55 is of assistance to a craftsperson in removing the jacket.

As seen in FIG. 3, an end portion of the jacketed cable extends through an outer grommet 57 which is disposed in an opening in the outer end plate 22. Between the outer and inner end plates 22 and 24, the plastic jacket 53 and the metallic shield 51 are removed from an end portion of the cable. The exposed tubular member or members are extended through an inner grommet 43 into the closure where conductors thereof are spliced to conductors of other cable or cables. Of course, the portion of the cable the conductors of which are exposed within the closure may not be the end portion of the cable but rather an intermediate portion which has been exposed for splicing purposes.

It becomes important that no relative motion be permitted between the end plates and the cable end portions extending therethrough. Otherwise, forces may be transmitted to splice connections within the closure possibly causing signal attenuation or the relative motion may break the seal of the grommets on the cable. In order to prevent such relative movement, the end plate assembly is provided with a sheath grip assembly.

Figure 2:
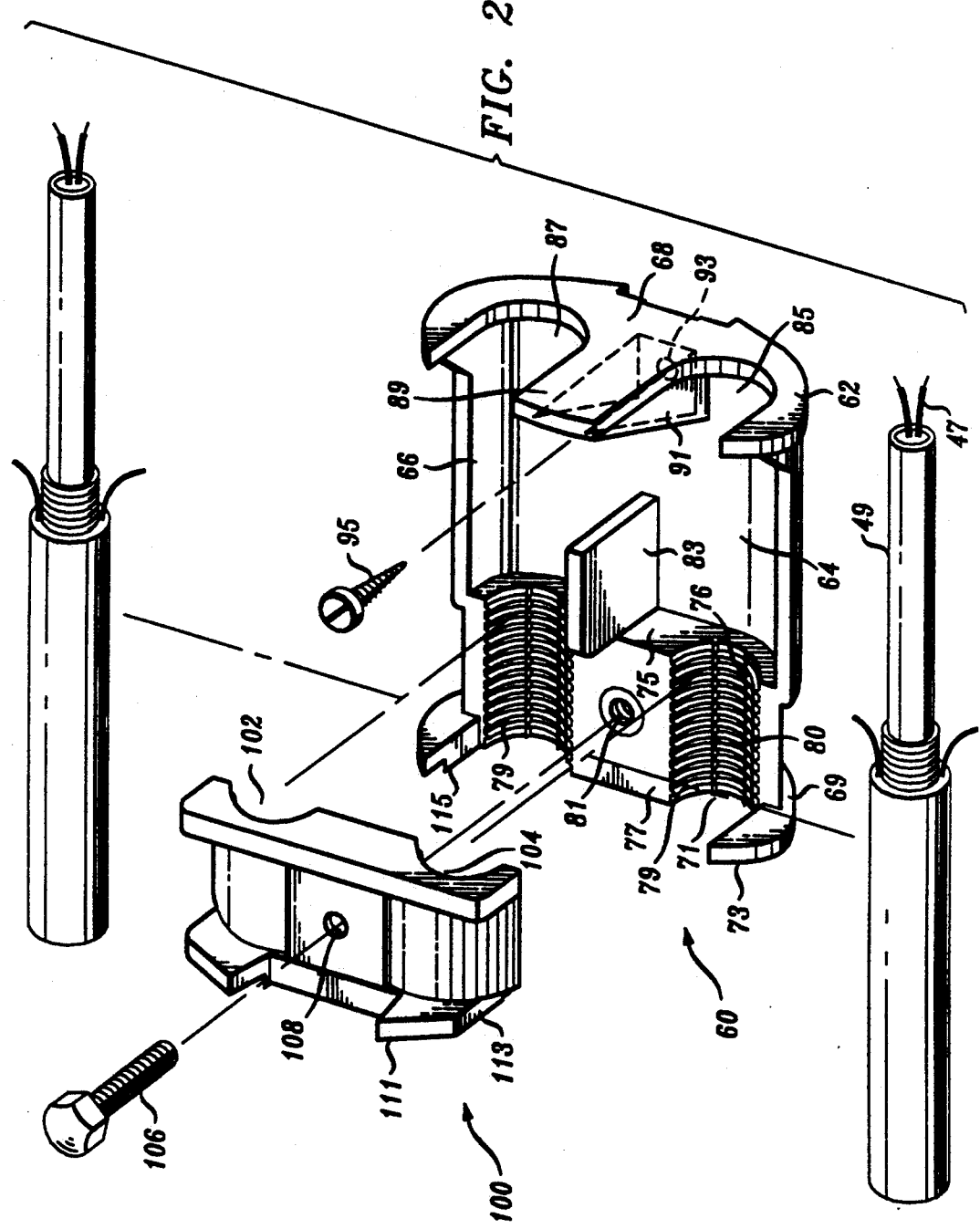
FIG. 2 is an exploded perspective view of the sheath grip assembly of FIG. 1.

A sheath grip assembly designated generally by the numeral 60 is shown in FIG. 2. The sheath grip assembly 60 includes a housing 62 which is made of a plastic material such as glass reinforced nylon. The housing includes a base 64 having curved sidewalls 66—66 extending therefrom, a first endwall 68 and a second endwall 69. The endwall 69 is provided with two partially circular openings 71—71 each of which on an outer side terminates in an upstanding portion 73. An inner surface of each upstanding portion 73 extends from an associated one of the partially circular portions. Also, the endwall 69 is integral with an end block 75 having a center portion 77 disposed centrally between partially circular channels 76—76. The partially circular openings of the end wall are continued along the end block 75. As can be seen in FIG. 2, a surface which defines the opening in the endwall 69 and the arcuate channel 76 in the end block is provided with arcuately shaped ribs 79—79 and longitudinal ribs 80—80.

Further, the end block 75 is provided with a threaded insert 81. Also extending from the end block 75 toward the endwall 62 is an isolation member 83. As should be apparent, cable end portions become disposed in the channels. The isolation member 83 provides electrical isolation between metallic elements of cables which extend along the channels and into the closure. The electrical isolation block not only extends toward the endwall 68 but also it projects above the end block 75.

At the opposite end of the housing 62 in the endwall 68 are provided two partially circular openings 85 and 87 spaced apart by a center partition 89. On each side of the partition 89 and integral therewith is a wedge-shaped leg 91 to strengthen the partition. Each leg 91 tapers from the partition 89 to a wide portion integral with the base 64. An opening 93 is formed in the base 64 between the legs 91—91. The opening 93 is adapted to hold a threaded fastener 95 captively in position Adapted to be disposed over the end block 75 and the two channels is a clamping portion 100 which also is made of a plastic such as glass reinforced nylon. The clamping portion 100 includes two generally arcuate troughs 102—102 each of which is provided with a plurality of inwardly projecting circumferential and axial ribs 104—104. When an end portion of a cable is disposed in a channel 76 of the housing and an aligned associated channel of the clamping portion, the ribs are adapted to engage the cable jacket. Forces are caused to be applied to the jacket by the turning of a bolt 106 through an opening 108 in the clamping portion and into the internally threaded insert 81 in the end block 75. The ribs are such that they tend to dig into the cable jacket thereby clamping the cable and preventing relative movement between the cables and the end plate assembly.

It also will be observed from the drawings that the clamping portion 100 is received between the upstanding portions 73—73 and the isolation member 83. One end of the clamping portion 100 is provided with spaced apart fins 111—111 each of which includes an edge surface 113. When the clamping portion 100 is caused to become disposed between the upstanding portions 73—73 and the isolation member 83, the surfaces 113—113 engage edge surfaces 115—115 of the upstanding portions of the housing.

Advantageously, the sheath grip assembly is capable of accommodating different outside diameter cables within a range of sizes. This obviates the need to inventory a supply of different size hardware as was done in the past to accommodate different size cables or the need to bend the sheath grip to conform to different cable diameters. The assembly of the clamping portion 100 with the housing 62 has sufficient play so that the clamping portion may tilt with respect to the housing to accommodate different size cables in the two channels. Also, the sheath grip assembly is effective to prevent grommet displacement. Should pressures inside the closure become too high during testing for seal effectiveness, the grommets in the inner end plate tended to be pushed outwardly. Likewise, external forces due to hydraulic pressure or ice expansion tended to push grommets in the outer end plate inwardly. The sheath grip assembly of the closure of this invention, as can be seen in FIG. 3 provides support in engagement with the grommets in the inner and outer end plates to prevent displacement. Another advantage is derived from the sheath grip assembly being made of a plastic material. This avoids any shorting out because of contact between prior art metallic sheath gripping hardware and metal brackets which engage electrically the shielding system of the cable. Not only does the cooperation between the ribs in the channels of the housing and the clamping portion of the sheath gripping assembly provide for enhanced cable sheath gripping against longitudinally applied forces, but also the ribs prevent rotation of the cable with respect to the sheath gripping assembly. Lastly, the sheath gripping assembly is craft friendly. Eliminated are the myriad of parts of prior art sheath gripping assemblies or the need to bend metal brackets to adapt the metal brackets prior to assembly with the replacement being a two part assembly easily assembled and secured together with a single bolt.

Of course, the principles of this invention cover sheath gripping assembly which accommodates only one cable. In that instance, the channel of the end block and the cooperating trough of the clamping portion would be disposed along a centerline axis of the sheath gripping assembly with a bolt outboard each side in order to provide suitable clamping action.

It is to be understood that the above-described arrangements are simply illustrative of the invention. Other arrangements may be devised by those skilled in the art which will embody the principles of the invention and fall within the spirit and scope thereof.

I claim:

1. A closure into which end portions of cables extend, said closure comprising:
    an end plate assembly which includes at least one opening therethrough;
    a grommet which is disposed in said opening and which includes a passageway therethrough for having an end portion of a cable extend therethrough; and
    a cable sheath gripping assembly which is disposed within said end plate assembly and which includes a housing and a clamping portion which are adapted to be assembled together, said housing and said clamping portion each including at least one channel and at least one trough, respectively, which cooperate to provide cable receiving passageways with each channel and trough including a plurality of inwardly directed circumferential and axial ribs that cooperate to clamp a cable end portion therebetween and prevent relative movement between the cable end portion and the sheath gripping assembly.

2. The closure of claim 1, wherein said means for applying forces to said clamping portion includes a fastener which is turned threadably into said housing.

3. The closure of claim 2, wherein said cable sheath gripping assembly includes two spaced channels and two aligned, spaced troughs and wherein said housing also includes an electrical isolation member which is disposed between ends of said housing and wherein said clamping portion is adapted to be disposed between said isolation member and the end of said housing in which said channels are formed.

4. The closure of claim 3, wherein an end of said housing opposite to that end in which said channels are formed is provided with two spaced openings through each of which a cable is capable of extending, said openings being spaced apart by a wall buttressed by two wedge-shaped strengthening legs connected to said wall.

5. The closure of claim 4, wherein said clamping portion is mounted for sliding movement relative to said housing to allow said clamping portion to be moved toward or farther from said housing to vary the size of said cable-receiving passageways and thereby allow said sheath gripping assembly to be used to accommodate any cable from a range of size cables.

6. The closure of claim 5, wherein said housing at said one end is provided with upstanding portions to define an exterior side of said channels, with each said upstanding portion including an edge surface which cooperates with an edge surface of said clamping portion and said housing.

7. The closure of claim 6, wherein said sheath gripping assembly is disposed between and secured to inner and outer end plates of said end plate assembly and in engagement with grommets disposed in said inner and outer end plates to maintain said grommets in said inner and outer end plates.

8. The closure of claim 1, wherein at least one sheath gripping assembly is disposed at one end of said closure.

9. The closure of claim 1, wherein at least one said cable sheath gripping assembly is disposed at each end of said closure.

10. A cable sheath gripping assembly, which comprises:
    a housing which includes a first end and a second end, said first end including at least one longitudinally extending channel which is provided with inwardly directed circumferential and axial ribs and said second end being provided with at least one opening which is with an associated channel; and
    a clamping portion adapted to be assembled with said housing, said clamping portion including at least one trough adapted to cooperate with an associated channel in said housing to provide a cable-receiving passageway, said channel of said clamping portion including a plurality of inwardly directed circumferential and axial ribs.

11. The cable sheath gripping assembly of claim 10, wherein said cable sheath gripping assembly includes two spaced channels and two aligned spaced troughs to form two cable passageways and wherein said housing also includes an electrical isolation member disposed between the ends of the housing and wherein said clamping portion is adapted to be disposed between said isolation member and the end of the housing in which said channels are formed.

12. The cable sheath gripping assembly of claim 11, wherein said clamping portion is capable of being tilted with respect to said housing when said clamping portion is assembled to said housing with different size cables in said cable-receiving passageways.

13. The cable sheath gripping assembly of claim 10, wherein said clamping portion is mounted for sliding movement relative to said housing to allow said clamping portion to be moved toward or farther away from said housing to vary the size of the cable-receiving passageways and thereby allow said sheath gripping assembly to be used to accommodate any cable from a range of cable sizes.

* * * * *